United States Patent Office 3,812,056
Patented May 21, 1974

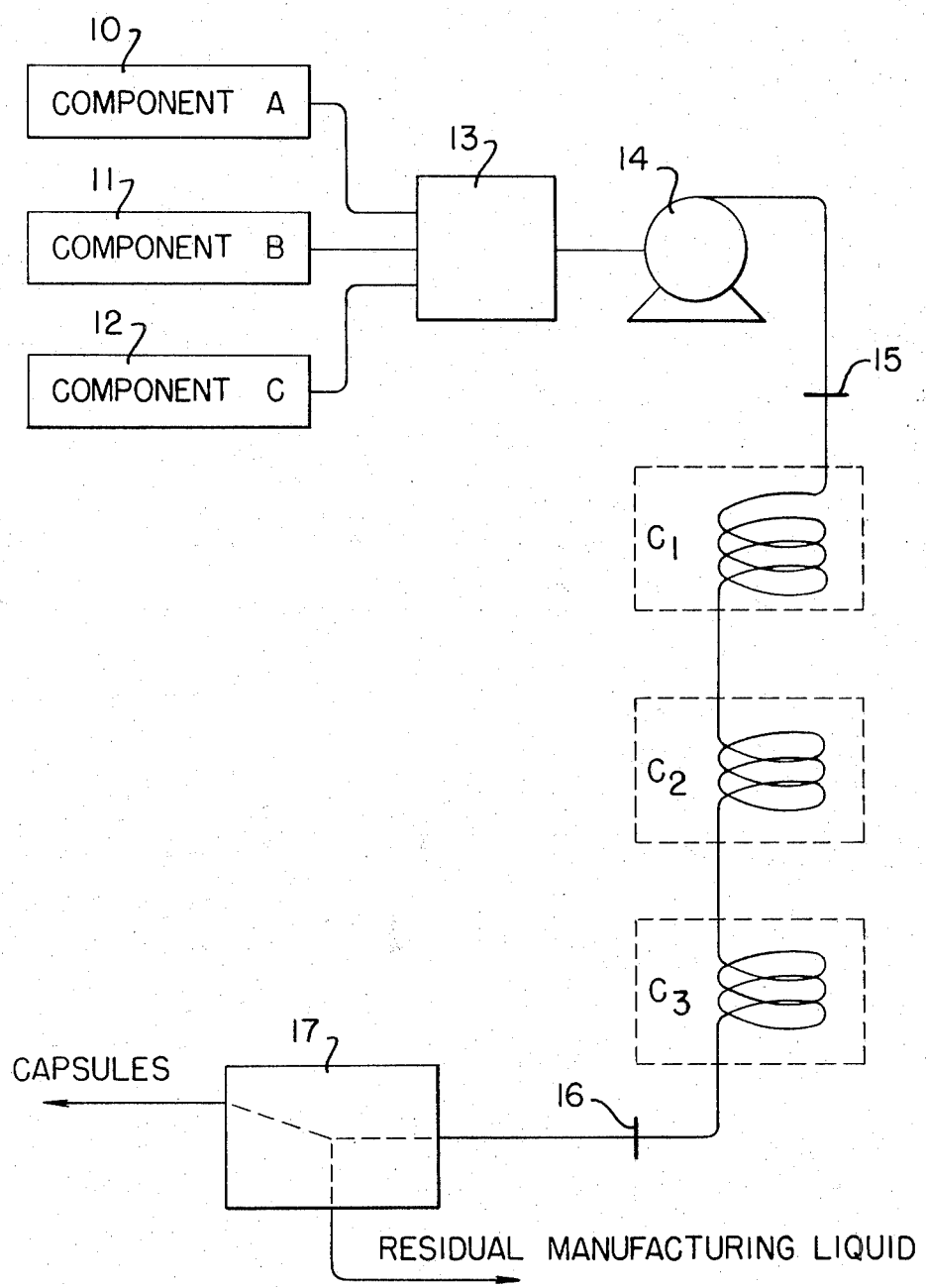

3,812,056
CONTINUOUS ENCAPSULATION
Leandro J. de la Torriente and Victor A. Crainich, Jr.,
Dayton, Ohio, assignors to The National Cash Register
Company, Dayton, Ohio
Filed July 5, 1972, Ser. No. 268,989
Int. Cl. B44d 1/02; B01j 13/02
U.S. Cl. 252—316                                3 Claims

ABSTRACT OF THE DISCLOSURE

Continuous encapsulation in a liquid capsule manufacturing vehicle by a process of liquid-liquid phase separation is disclosed. The continuous encapsulation is performed in a capsule manufacturing conduit which has only a single material entrance end and a single material exit end and has a substantially constant cross-sectional shape and area throughout its length. A mixture of all of the components required for encapsulating is continuously fed into one end of the conduit, is passed through the conduit in turbulent-flow, steady-state, conditions and emerges from the other end of the conduit as a dispersion of minute capsules in the manufacturing vehicle.

BACKGROUND OF THE INVENTION

Field of the invention

The present invention pertains to encapsulating processes conducted on a continuous basis and utilizing the phenomenon of liquid-liquid phase separation as the encapsulating mechanism. The present invention also relates to an apparatus for conducting the continuous encapsulating process. The continuous encapsulating process of this invention more particularly pertains to a method for rapidly manufacturing minute capsules of uniform size at a constant rate. A preferred embodiment of the process of this invention specifically pertains to a process for continuous encapsulating by use of a liquid-liquid phase separation to contain intended capsule core materials substantially insoluble in the manufacturing vehicle. The apparatus of the present invention includes a conduit having only a single input or entrance end and only a single output or exit end. A preferred embodiment of the apparatus of this invention specifically relates to the continuous introduction of an intimate mixture of all components of a liquid-liquid phase separating encapsulating system and an intended capsule core material into one end of the conduit, passage of that mixture through the conduit under turbulent-flow, steady-state, temperature-controlled conditions and continuous, emergence from the other conduit end, of minute capsules dispersed in an aqueous solution.

Description of the prior art

The prior art has taught encapsulating processes of a batch nature using liquid-liquid phase separation. U.S. Pat. Nos. 2,800,457 and 2,800,458, issued July 23, 1957, on the applications of B. K. Green and L. Schleicher and of B. K. Green, respectively, disclose such processes in an aqueous system wherein a preferred capsule wall material is gelatin and the material inducing phase separation is another hydrophilic polymeric material or a water soluble salt, now abandoned, U.S. Pat. application S.N. 701,124, filed Jan. 29, 1968, on the application of R. G. Bayless and D. D. Emrick discloses another process for manufacturing minute capsules in a batch-wise manner using aqueous liquid-liquid phase separation.

U.S. Pat. No. 3,155,590, issued Nov. 3, 1964, on the application of R. E. Miller and J. L. Anderson discloses an encapsulating process of cyclic nature where various components of a liquid-liquid phase separating system are replenished batch-by-batch after completion of each encapsulating procedure. There are none of the aspects of a truly continuous process disclosed in the above-identified patents; all of these processes requiring periodic addition of components and removal of capsule product and spent manufacturing vehicle and none exhibiting steady-state flow conditions.

A continuous encapsulation process has been disclosed in U.S. Pat. No. 3,464,926, issued Sept. 2, 1969, on the application of J. E. Vandegaer et al. The process therein disclosed requires interfacial polymerization as the means for developing a capsule wall. One of two reactive components is carried in each of the materials to be encapsulated and the surrounding capsule manufacturing vehicle. Moreover, the capsules manufactured therein are required to have a velocity relative to the manufacturing vehicle. Success of the interfacial encapsulation requires a density gradient adequate to permit movement of intended capsule cores through the manufacturing vehicle without pumping the vehicle while, at the same time, maintaining laminar flow of the vehicle.

U.S. Pat. Nos. 3,015,128 and 3,310,612, issued Jan. 2, 1967, and Mar. 21, 1967, respectively, on applications of G. R. Somerville, Jr., disclose mechanical methods for continuous encapsulation requiring impingement of intended capsule cores on hardenable films of polymeric capsule wall material.

SUMMARY OF THE INVENTION

The present invention comprises a tubular encapsulating conduit having only a single material entrance and a single material exit, in which conduit a continuous encapsulating process is performed. The encapsulating system of this process includes a polymeric material for use as capsule wall and a liquid-liquid-phase-separation-inducing material for causing phase separation and deposit of the capsule wall. The component materials of the system are present in a liquid solvent vehicle which solvent is capable of dissolving any of the component materials individually but which exists as a common solvent between separate liquid phases when the component materials are combined. The material to be encapsulated is substantially insoluble in the solvent and other components of the system and, of course, cannot be chosen to be reactive with any of the components. In practice of the invention, the material to be encapsulated is intimately combined with the encapsulating system to yield a premix. The premix is a three-phase system comprising a major amount of a continuous liquid vehicle relatively concentrated in liquid-liquid-phase-separation-inducing material, a minor amount of a dispersion of mobile, liquid, globules relatively concentrated in polymeric capsule wall material and a minor amount of finely-divided or dispersed intended capsule core material. The premix contains all materials which are required to manufacture capsules and must be processed through a proper temperature cycle under appropriate conditions of flow in order to complete the encapsulation.

The encapsulating conduit of this invention is a completely closed tubular system of substantially constant cross-section along its length. The conduit has a material entrance at one end and a material exit at the other end. There are no other ports for introduction or removal of materials. A pumping means is applied to the conduit for transporting the conduit contents from the entrance end to the exit end and temperature controlling means are established along the conduit at appropriate locations for achieving an encapsulation using any particular encapsulating system of materials.

The premix is introduced at one end of the conduit under conditions wherein the separated phase of capsule wall material is liquid. During the course of operation, conditions along the conduit, at any particular location, are maintained constant. (To be more completely explained hereinbelow.) Temperature gradients along the conduit are maintained such that the incoming liquid, separated phase of capsule wall material, is rendered more viscous, enwraps dispersed intended capsule core materials and is finally solidified or gelled to yield capsules having self-supporting walls of the polymeric capsule wall material.

In prior art processes, batch encapsulation using similar systems of components was also achieved by changes in temperature of the system. An important difference between the batch processes of the prior art and the continuous process of the present invention resides in the time required to complete encapsulation. The batch processes utilizing liquid-liquid phase separation require encapsulation processing times in the order of hours and encapsulation in the present invention is completed in a few minutes and, in some cases, in a matter of seconds. The continuous process, once begun and established in equilibrium, needs only to be continually supplied with premix; and capsule manufacture can be conducted for an indefinitely long period of time without shut-down of operation or change-over of apparatus. Batch processes require variation in system conditions as a function of time and also require addition of materials to the system and transfer of the system from vessel to vessel as encapsulation proceeds.

There are two important processing considerations in practice of the present invention which serve to distinguish the continuous encapsulation from the batch-wise encapsulation of the prior art using liquid-liquid phase separation. First, flow in the conduit is substantially uniformly turbulent at any given cross-section of the conduit. Such turbulent flow established all along the encapsulating conduit subjects each particle of intended capsule core material to similar forces at a given incremental position and supplies dispersing energies to each bit of the material such that the material is dispersed in a narrow range of particle sizes. It is noteworthy that batch-wise encapsulating processes utilize agitating forces in large vessels such that at some locations there is very high-shear, turbulent, agitating force and at other locations, at the same time, in the same vessel, there are laminar flow conditions.

Encapsulating processes which rely on wetting and enwrapping of one material with another material while both materials are suspended in a liquid vehicle, are particularly subject to the shearing forces associated with the different materials in fluid flow. The capsule manufacturing vehicle must exist in a state of turbulence to prevent agglomeration of embryonic capsules as they are formed; and yet the embryonic capsule itself must move with the manufacturing vehicle under conditions of laminar flow. Laminar flow is required to prevent loss of ungelled capsule walls by excessive shearing forces of the manufacturing vehicle against the embryonic capsules.

A convenient method for obtaining an indication of the degree of turbulence in flow through the device of this invention is determination of a dimensionless engineering value, termed the Reynolds Number. It has been determined that turbulent flow in the device of this invention occurs at a Reynolds Number of greater than about 2000, most probably at about 4000 and certainly at less than 10,000; the exact Reynolds Number at which turbulence occurs being rather difficult to ascertain. Reynolds Number is designated by R in the following equation:

$$R = \frac{DV\rho}{\mu}$$

wherein D is a characteristic length associated with the system such as the diameter of a capsule or the diameter of the conduit; V is a characteristic velocity of the system such as the velocity of an individual capsule or of a cross-section front of the vehicle moving through the conduit; $\rho$ is the density of the flowing material and $\mu$ is the viscosity of the fluid being observed such as the viscosity of the ungelled capsule wall or the viscosity of the manufacturing vehicle. For practical purposes, the velocity of the capsules can be taken to be very nearly the same as the velocity of the vehicle flowing through the conduit, that is, there is very little, if any, relative motion between the capsules and the vehicle. Also, the density of the capsule can be taken to be nearly equal with the density of the vehicle. The Reynolds Number must be calculated using a consistent system of dimensions such as grams-centimeters-seconds.

In preferred practice of this invention, the Reynolds Number for flow of the liquid with respect to the conduit is maintained at greater than 4000 (turbulent flow of the liquid) and the Reynolds Number for movement of the capsules with respect to the conduit is maintained at less than 4000 (non-turbulent movement of the capsules). That these conditions of turbulence can be maintained, is determined by observing that D, the characteristic length of the Reynolds Number formula, can be more than 1000 times greater for the conduit than for the capsule. In continuous encapsulation through a conduit, there is a substantially constant degree of turbulence as compared to the inconstant degree of turbulence which can be accomplished in a batch-wise vessel as above-described.

Continuous encapsulation through a conduit is characterized by steady-state flow conditions in the capsule manufacturing liquid. Steady-state flow is defined as a condition of flow wherein the characteristics of a system, at any given location, are constant and unchanging as a function of time. In other words, a system under steady-state flow conditions has attained an equilibrium of conditions. In the present invention, conditions along the length of the conduit vary; but at any given cross-section location in the conduit, conditions remain constant. Thus, once conditions are established, they are maintained constant. The flow-rate, material concentrations, temperatures and other parameters are carefully controlled to maintain conditions such that the premix is introduced into the conduit at a constant rate and capsules emerge from the conduit at a constant rate.

Encapsulating systems eligible for use in the present invention include systems using liquid-liquid phase separation as the capsule forming mechanism. Preferred, are such liquid-liquid phase separating systems which utilize aqueous manufacturing vehicles. Aqueous systems include systems which require cooling for solidification or gelation of the capsule wall material and systems wherein the liquid capsule walls, once deposited, are heated for solidification. Examples of materials eligible for use in such aqueous encapsulating systems are: unmodified acid- or alkali-precursor gelatins; modified gelatins such as succinylated gelatin; gum arabic; carrageenin; hydrolyzed poly(methylvinylether-co-maleic anhydride); hydrolyzed poly(ethylvinylether-co-maleic anhydride); poly(vinyl alcohol); poly(vinylpyrrolidone); poly(acrylic acid) and its salts; poly(methacrylic acid) and its salts; hydrolyzed poly-(ethylene-co-maleic anhydride); melamine/formaldehyde resin; cationic starch; zein; poly(ethylene oxide); methylolated methylol melamine; albumin and the like. Various reactant materials can be included in the premix system to afford reactive means for solidifying the capsule wall materials. Such materials include: resorcinol, hydroquinone, catechol, phloroglucinol, pyrogallol, guaiacol, gallic acid, digallic acid, tannic acid, cresols, chlorophenols, xylenols, eugenol, isoeugenol, saligenin, thymol, hydroxyacetophenone, hydroxybiphenyls, bisphenol A, cashew nut oil phenols, formaldehyde, glyoxal, furfural, glutaraldehyde and the like.

Capsule internal phase material in capsules of the present invention can be any of a multitude of different kinds and types of materials. The most important criteria in selection of the materials which are eligible for use as the internal phase of capsules are: (a) that the intended internal phase material be substantially insoluble in the manufacturing vehicle and (b) that the intended capsule internal phase material be substantially non-reactive with other components of the capsule or coacervate film manufacturing system. A few of the materials which can, for example, be utilized as capsule internal phases in a system using an aqueous vehicle include among a multitude of others: water insoluble or substantially water insoluble liquids, such as olive oil, fish oils, vegetable oils, sperm oil, mineral oil, xylene, toluene, benzene, kerosene, chlorinated biphenyl, and methyl salicylate; substantially water insoluble metallic oxides, sulfides and salts; fibrous materials, such as cellulose or asbestos; substantially water insoluble synthetic polymeric materials, liquid or solid, including plastisols, organosols and polymerizable compounds; minerals; pigments; glasses; elemental materials, including solids, liquids and gases; flavors; fragrances; reactants; biocidal compositions; physiological compositions; fertilizer compositions, and the like. In a similar manner, materials insoluble in non-aqueous vehicles can be encapsulated in systems using those vehicles. In short, the materials which can be contained in capsules manufacture by the process of the present invention can differ not only among themselves in their physical state, which can be solid, liquid, gas, or combinations thereof, but can differ in their chemical composition and in their intended use. The capsule wall materials provide protection for the capsule internal phase materials, such as, protection from ambient conditions, protection from oxidation or ultra-violet radiation, protection from sublimation or evaporation, from crystallization in solution, and the like.

Examples of other systems eligible in practice of this invention are non-aqueous systems utilizing liquid-liquid phase separation of such capsule wall materials as: ethyl cellulose; cellulose nitrate; cellulose acetate phthalate; polymethylmethacrylate; acrylonitrile-styrene copolymer; polystyrene; vinylidene chloride-acrylonitrile copolymer; epoxy resin; polyvinyl-formal; and the like. Examples of phase separation inducing agents eligible for use herein include: polybutadiene; siloxane polymers; methacrylate polymers; mineral oils; vegetable oils; and the like.

Capsules made according to the process of the present invention are substantially spherical, have seamless walls, and are not limited as to size or as to internal phase contents. The broad range of internal phase contents was hereinabove disclosed and the size range of capsules made by the present invention can extend from a lower limit of a few to several microns up to a large limit of a few hundred microns or perhaps slightly larger. The usual size for capsules made according to the present process is from one or two microns to about 200 microns in average diameter. Capsules of the aforementioned size are considered to be minute and are preferred. Capsules made according to the present invention can be made to contain a range of amounts of internal phase material. The capsules can contain from 0 to more than 99 percent, by weight of an internal phase material. The most usual and preferred range for the amount of material to be contained in capsules manufactured according to the present invention is from about 50 to about 97 percent, by weight. Also, capsules can be manufactured containing releasable or evaporable material which, on isolation, empty and yield hollow shells of capsule wall material. Under proper conditions, gas bubbles can be pumped through the conduit and encapsulated by the present process to yield hollow shells of capsule wall material.

BRIEF DESCRIPTION OF THE DRAWING

The figure is a schematic flow-diagram representation of the process and the apparatus of the present invention. Individual components required in the present encapsulation process are fed continuously from supply tanks 10, 11, 12 into a premix vessel 13 where the components are admixed under proper conditions to yield a liquid separated phase and an intended capsule internal phase, both dispersed in a liquid capsule manufacture vehicle. The three-phase premix liquid is then transferred in turbulent flow, such as by means of a pump 14, into the entrance end 15 of the encapsulating conduit under the first of a progressive series of encapsulating conditions ($C_1$). The premix is passed on to and though subsequent regions of encapsulating conditions ($C_2$, $C_3$ . . .) and out through the exit end 16 of the encapsulating conduit. On exit, the premix has been altered to a dispersion system of capsules in a liquid manufacturing vehicle and the dispersion is passed through a capsule separating vessel 17 to yield capsules and residual manufacturing liquid. The novel portion of the encapsulating process and that which is considered to be patentable herein occurs between the entrance end 15 and the exit end 16 of the encapsulating conduit. Care must be exercised that the liquid premix flow is turbulent and turbulence must be maintained throughout the conduit, for example in accordance with the previously described Reynolds Number requirements. The conditions ($C_1$, $C_2$, $C_3$) can represent step-wise progressions from premix to completed capsules or the conditions can undergo continuous change from the entrance end 15 to the exit end 16 or over some lesser portion of the conduit. The internal conduit conditions discussed herein generally, but not exclusively, refer to temperature and the change is generally from higher temperature to lower temperature in order to gel or solidify liquid capsule walls. Some encapsulating systems eligible for use herein require increase in temperature to solidify liquid capsule walls. In such cases, the progressive conditions of the conduit extend from a lower to a higher temperature.

If required or desired, as an adjunct to the present process, the ambient environmental pressure in which the encapsulation is conducted can be either above or below atmospheric pressure. Such might be useful, for example, to encapsulate very volatile liquids under greater-than-atmospheric pressure in order to minimize loss of the material by evaporation or to supply a material in internally pressurized capsules. Encapsulation under less-than-atmospheric pressure may be useful, for example, to ensure that liquids to be encapsulated are not contaminated by dissolved gases.

DESCRIPTION OF PREFERRED EMBODIMENT

All parts and percents are by weight, unless specified otherwise.

In practice of the invention, the preferred conduit is a flexible tubing having an inside diameter of approximately one-eighth inch. For the present description, the tubing is about 150 feet in length and is generally divided into three temperature sections. The temperature sections are defined by constant-temperature baths in which appropriate portions of the tubing are immersed or effectively contacted. The entrance end of the conduit is connected to a premix vessel through a pumping means for conducting materials over the entire length of the conduit. The exit end of the conduit is connected to the capsule separating vessel which comprises a capsule wall shrinking bath and means for separating the capsules from the capsule manufacturing liquids. The pumping means for this example, using a conduit of one-eighth inch internal diameter and 150 feet long, is selected to provide a liquid residence time of about eight minutes, thus affording a continuous flow rate of approximately one-eighth gallon per minute (500 milliliters per minute). The conduit size and length can be varied over a wide range extending from about one-sixteenth inch diameter to one-half inch or more and, perhaps up to about one inch; and from less than about 25 feet to about 500 feet or more. The conduit dimensions are selected as a function of the encapsulating system to be used and in accordance with the requisite volume of capsule production. If desired or required, intermediate pumping means can be inserted in the encapsulating conduit between the entrance and exit ends.

Using a conduit described herein and pumping means adequate to provide turbulent flow through the conduit, an encapsulating system is provided in the premix vessel and the system therein is maintained at about 40 degrees centigrade. The encapsulating system comprises the following volume ratio of materials:

1 part of 11 percent, by weight, aqueous gelatin solution
1 part of 11 percent, by weight, aqueous gum arabic solution
3 parts of water
1.5 parts of xylene The gelatin is acid-extracted porkskin gelatin having a Bloom strength of 285–305 grams, a solution pH of about 4.2 and an isoelectric point of pH 8–9. The xylene is a representative intended capsule internal phase material for this example. The encapsulation system is a three-phase system including manufacturing vehicle, separated phase of capsule wall material and internal phase material and the system is agitated in the premix vessel and maintained at a temperature of about 40 degrees centigrade. The agitation is maintained at a rate to yield dispersed droplets of internal phase having an average diameter of about 50 to 250 microns and the dispersion is commenced through the conduit into a first of three temperature zones. The conduit is sectioned into 50-foot lengths and the lengths are maintained at constant temperatures of 33, 31 and 30 degrees centigrade, respectively, in the order of contact by advancing liquid. During the course of its progress through the conduit, phase-separated capsule wall material deposits onto droplets of the intended internal phase and becomes progressively more solid as the temperature is decreased. Capsules emerge from the exit end of the conduit and are passed into the capsule separating vessel which contains a continually replenished supply of chilled, aqueous, salt solution. By chilled is meant held at a temperature of less than 20 degrees centigrade—usually from about 0 to 10 degrees centigrade. Salt of the solution is generally any of several well-known electrolytes useful for maintaining separated phases in aqueous solutions of hydrophilic polymers. Exemplary of such salts are sodium, ammonium, and potassium sulfate, citrate, acetate and chloride. If desired or required, additional temperature stages can be added, for example maintaining a temperature at about 28 degrees centigrade, to more completely solidify the capsule wall material. It is noted that, in this example, capsule wall formation occurs by gelling initially liquid wall-forming solution. Such gelling requires decreasing temperature and is accomplished by the arrangement hereinabove described.

An example of an encapsulation system requiring temperature increase comprises the following volume ratio of materials:

1 part of 5 percent, by weight, aqueous polyvinyl alcohol solution
1 part of water
2 parts of 1.5 percent, by weight, aqueous gallic acid solution
1 part of 11 percent, by weight, aqueous gum arabic solution
0.5 part of xylene.

The polyvinyl alcohol is sometimes a combination of products and preferred hereinabove is about 1 to 19, by weight, ratio of highly hydrolyzed to partially hydrolyzed polyvinyl alcohol. The highly hydrolyzed polyvinyl alcohol is about 99 to 100 percent hydrolyzed and is exemplified by a material designated as "Elvanol 71–30" (trademark) sold by E. I. du Pont de Nemours and Co., Wilmington, Delaware, United States of America, having a molecular weight of about 86,000 and a viscosity of about 28 to 32 centipoises in a 4 percent, by weight, aqueous solution at 20 degrees centigrade. The partially hydrolyzed polyvinyl alcohol is about 87 to 89 percent hydrolyzed and is exemplified by a material designated as "Elvanol 50–42" (trademark) sold by E. I. du Pont de Nemours and Co., having a molecular weight of about 125,000 and a viscosity of about 35 to 45 centipoises in a 4 percent, by weight, aqueous solution at 20 degrees centigrade. The xylene is, again, a representative intended capsule internal phase material. The encapsulation system is a three-phase system including continuous manufacturing vehicle, separated phase of capsule wall material and intended internal phase material and the system is agitated in the premix vessel at a temperature of about 10 degrees centigrade. It is noted that the encapsulation procedure using these materials requires an increase in temperature for the process to be completed. Accordingly, the constant temperature sections of the conduit are maintained at about 35, 45 and 55 degrees centigrade, respectively, in the order of contact by advancing liquid. Agitation is maintained in the premix vessel and the dispersion is pumped as previously described.

Liquid emerging from the exit end of the conduit includes droplets of xylene encapsulated by a solidified wall of polyvinyl alcohol and gallic acid. A system of hydrophobic materials for encapsulating by means of water-insoluble capsule wall materials can be described by combining 12 parts of about 2 percent solution, in toluene, of a particular poly(ethylene-co-vinyl acetate), described below, 1 part of cottonseed oil, and about 1–2 parts of insoluble internal phase material (such as for example, glycerol or sodium bicarbonate). The poly(ethylene-co-vinyl acetate) is capsule wall material, the cottonseed oil is phase-separation-inducing material, and the internal phase material is dispersed therein in a premix vessel to a desired droplet size; the system being maintained in the premix vessel and the dispersion is pumped, as previously described, into a conduit appropriately selected to be impervious to components of the system. A first constant temperature section is maintained at about 60 degrees centigrade into which the dispersion is directed to achieve an initial chilling effect. A next section of the conduit undergoes a controlled and gradual temperature decrease from about 60 degrees centigrade to about 20 degrees centigrade. Liquid emerging from the exit end of the conduit includes capsules having a solidified wall of poly(ethylene-co-vinyl acetate) and the emergent stream can either be sent to a capsule separating vessel or to a capsule wall treating vessel wherein the capsule walls will be chemically hardened. Appropriate capsule hardening materials are toluene diisocyanate or oxalyl chloride. The poly(ethylene-co-vinyl acetate) material of this example is partially hydrolyzed to the extent of about 50 to 53 percent of the available acetate groups and is available from E. I. du Pont de Nemours & Co., Inc., Wilmington, Del., U.S.A. under the trademark designation, "Elvon PB–7802" hydroxyvinyl resin. Other features of the materials eligible for use in this example of encapsulation can be found in U.S. Pat. No. 3,674,704, issued to the assignee herein on July 4, 1972.

What is claimed is:

1. A process for continuously manufacturing minute capsules in a liquid capsule manufacturing vehicle in a closed capsule manufacturing conduit having only an entrance opening and an exit opening comprising the steps of:
    (a) introducing an intimate mixture of an intended capsule core material and the liquid capsule manufacturing vehicle containing dissolved polymeric capsule wall material and phase-separation-inducing material, into the entrance opening of the capsule manufacturing conduit;
    (b) conducting the intimate mixture through the conduit in steady-state flow at a rate such that:
        (i)

$$\frac{DV\rho}{\mu}$$

is greater than 4000 where D is the conduit diameter, V is the velocity of a cross-section front of the vehicle moving through the conduit, $\rho$ is the density of the vehicle and $\mu$ is the viscosity of the vehicle; and (ii)
$$\frac{DV\rho}{\mu}$$

is less than 4000 where D is the capsule diameter, V is the velocity of an individual capsule moving through the conduit, $\rho$ is the density of the capsules and $\mu$ is the viscosity of the ungelled capsule wall;

(c) maintaining temperature gradient conditions along the conduit to yield self-supporting capsule wall material enwrapping the intended capsule cores;

(d) withdrawing the mixture through the exit opening the the conduit said mixture having been altered and consisting of a dispersion system of capsules in the residual manufacturing liquid.

2. The process of claim 1 wherein the manufacturing vehicle is aqueous.

3. The process of claim 1 wherein the manufacturing vehicle utilizes organic solvent.

References Cited
UNITED STATES PATENTS

| | | | |
|---|---|---|---|
| 3,297,466 | 1/1967 | Herman et al. | 117—100 AX |
| 3,415,758 | 12/1968 | Powell et al. | 252—316 |
| 3,436,355 | 4/1969 | Bakan | 252—316 |

FOREIGN PATENTS

| | | | |
|---|---|---|---|
| 1,025,694 | 4/1966 | Great Britain | 117—100 A |

RICHARD D. LOVERING, Primary Examiner

U.S. Cl. X.R.

117—100 A, 100 B; 252—359 R; 264—4